United States Patent
Burns (10) Patent No.: US 7,400,787 B2
(45) Date of Patent: Jul. 15, 2008

(54) OPTICAL MODULATOR WITH COUPLED COPLANAR STRIP ELECTRODE AND DOMAIN INVERSION

(75) Inventor: William K. Burns, Alexandria, VA (US)

(73) Assignee: Photonic Systems, Inc., Billerica, MA (US)

( * ) Notice: Subject to any disclaimer, the term of this patent is extended or adjusted under 35 U.S.C. 154(b) by 119 days.

(21) Appl. No.: 11/100,641

(22) Filed: Apr. 7, 2005

(65) Prior Publication Data

US 2006/0228065 A1 Oct. 12, 2006

(51) Int. Cl.
G02F 1/035 (2006.01)

(52) U.S. Cl. .......................................................... 385/3

(58) Field of Classification Search .................. None
See application file for complete search history.

(56) References Cited

U.S. PATENT DOCUMENTS

| | | | |
|---|---|---|---|
| 5,267,336 A | 11/1993 | Sriram et al. | |
| 5,278,924 A | 1/1994 | Schaffner | |
| 5,416,859 A | 5/1995 | Burns et al. | |
| 5,644,664 A | 7/1997 | Burns et al. | |
| 6,021,232 A * | 2/2000 | Madabhushi | 385/3 |
| 6,055,342 A | 4/2000 | Yi et al. | |
| 6,304,685 B1 | 10/2001 | Burns | |
| 6,356,673 B1 | 3/2002 | Burns | |
| 6,653,630 B2 | 11/2003 | Rosenman et al. | |
| 6,760,493 B2 * | 7/2004 | Pruneri et al. | 385/8 |
| 2001/0046341 A1 | 11/2001 | Nakabayashi | |
| 2002/0126934 A1 | 9/2002 | Burns | |
| 2003/0002766 A1 * | 1/2003 | Pruneri et al. | 385/2 |
| 2003/0012480 A1 | 1/2003 | Pruneri et al. | |
| 2003/0031400 A1 | 2/2003 | Pruneri | |
| 2003/0228081 A1 | 12/2003 | Tavlykaev et al. | |
| 2005/0175271 A1 * | 8/2005 | Sugiyama et al. | 385/3 |

FOREIGN PATENT DOCUMENTS

JP 2003-202530 7/2003

OTHER PUBLICATIONS

Courjal, Nadege, et al., "LiNbO3 Mach-Zehnder Modulator with Chirp Adjusted by Ferroelectric Domain Inversion," Photonics Tech. Lett., vol. 14, No. 11, 12 pp., Nov. 2002.

Gupta, K.C., et al., "Microstrip Lines and Slotlines," chapter 8, pp. 457-467, in "Coupled Microstrip Lines," 2nd Ed., Artech House, Boston, 1996.

Howerton, Marta M. et al., "Broadband traveling wave modulators in LiNbO3," in RF Photonic Technology in Optical Fiber Links, W.S.C. Chang Ed., Cambridge University Press, chapter 5, pp. 133-164, 2002.

(Continued)

*Primary Examiner*—Sung Pak
*Assistant Examiner*—Hoang Tran
(74) *Attorney, Agent, or Firm*—Houston Eliseeva LLP (57) ABSTRACT

A modulator includes an interferometer waveguide structure formed on an electro-optical substrate, preferably a Z-cut lithium niobate or a Z-cut lithium tantalate. The substrate includes a domain inversion between a region near the first arm and a region near the second arm of the interferometer waveguide structure. In one example, two coplanar strip electrode structures, each extending near at least a portion of the first arm and the second arm, respectively, are electrically coupled to each other.

27 Claims, 6 Drawing Sheets

OTHER PUBLICATIONS

Porte, Henri et al., "10Gb/s transmission using a low chirp modulator integrated in poled Z-cut LiNbO3 modulator," ECOC-IOOC, 2003, Rimini, Italy, vol. 1, pp. 118-119.

Wengler, M.C., et al., "Poling dynamics of lithium niobate crystals," Appl. Phys. B, vol. 76, pp. 393-396, 2003.

Noguchi, Kazuto et al., "Millimeter-Wave Ti:LiNbO$_3$ Optical Modulators," Journal of Lightwave Technology, vol. 16, No. 4, Apr. 1998, pp. 615-619.

International Search Report from International Patent Application PCT/US2006/012222, filed Apr. 4, 2006.

* cited by examiner

OPTICAL MODULATOR WITH COUPLED COPLANAR STRIP ELECTRODE AND DOMAIN INVERSION

BACKGROUND OF THE INVENTION

Mach Zehnder interferometers (MZIs) are used to modulate the amplitude or intensity of an optical signal, for instance in digital and analog communications and electric field sensors. Often, they are fabricated as monolithic devices on either Z-cut or X-cut lithium niobate or lithium tantalate.

A typical MZI includes two arms for dividing an optical input signal into two beams, which are then recombined. In one design, the arms have equal length. During operation, the relative phase of the two beams is controlled by some type of optical phase modulation in one or both arms in order to modulate the intensity of the output signal, which depends on the relative phase of the two beams.

In many applications, the drive voltage of the modulator is of particular interest as it affects link gain, sensor sensitivity, and drive power requirements for high speed, such as ~40 Gigahertz (GHz) or faster, analog or digital links. Drive voltage sensitivity is characterized by the product between the drive voltage and the length of the device electrodes.

For devices of limited size, such as found in many optical communication applications, drive voltages tend to be relatively high, for example in the 4 to 5 Volt (V) range. On the other hand, low voltages often are desired in analog applications, where switching between the on and off states is characterized by $V\pi$, $\pi$ being the total phase shift in the interferometer. As a result, such devices, when packaged, can be relatively long, for example in the 10 to 15 centimeter (cm) range. Generally, a Z-cut substrate is preferred when fabricating devices for which a low $V\pi$ is important. Typical values for the voltage-length(VL) product in such devices are in the 10 to 12 Vcm range.

Since the voltage length product depends on the intrinsic electro-optic coefficient of the material used, considerable effort has been devoted to investigating materials with high electro-optical coefficients. For a given electro-optical material, the voltage-length product depends on the detailed geometric configuration of waveguides and electrodes. Mathematically, this factor can be described by an overlap integral between the electrical and optical fields. It can be shown that the overlap integral is strongly dependent on the exact geometry chosen.

Modulators based on a coplanar waveguide (CPW) electrode structure and having horn arrangement on lithium niobate ($LiNbO_3$) substrates are disclosed in U.S. Pat. No. 6,304,685 B1, issued on Oct. 16, 2001 to W. K. Burns and U.S. Pat. No. 6,356,673 B1, issued on Mar. 12, 2002 to W. K. Burns, to the instant inventor, both applications being incorporated herein in their entirety by this reference. The use of ridge waveguides described in these patents was found to enhance the overlap integral, and to facilitate, simultaneously, velocity matching and near 50 Ohm line impedance.

In the prior CPW arrangement, a voltage is applied to a central hot electrode, which is disposed between two ground electrodes, with the vertical (Z-directed) electrical field component having opposite directions on the two arms of the interferometer. Thus, the phase changes accumulated in the two arms of the interferometer have opposite sign. Since the output of the interferometer depends on the difference of these phase changes, they add to produce the total phase change in the MZI. This is termed a "push-pull" configuration.

In the "push-pull" configuration associated with the CPW arrangement disclosed in U.S. Pat. No. 6,304,685 B1 and U.S. Pat. No. 6,356,673 B1, however, the electrical confinement is such that the overlap efficiency is uneven with respect to the two MZI waveguide arms. It is estimated that while the overlap integral for the waveguide under the central hot electrode contributes a large percentage of about 80% to the total phase change, the overlap integral for the MZI waveguide under the ground electrode contributes relatively little (about 20%) to the total phase changes.

Double coplanar strip (CPS) Mach Zehnder integrated electro-optical modulators are disclosed, for example, in US. Patent Application Publication No. 2003/0002766, by Pruneri et al., published on Jan. 2, 2003. In some of the arrangements shown in this reference, the substrate includes regions with mutually inverted ferroelectric domain orientations and the same drive voltage is applied to neighboring central electrodes. Electrical coupling between the neighboring central electrodes is prevented.

Domain reversal also has been proposed to make zero-chirp interferometers on Z-cut material.

SUMMARY OF THE INVENTION

While prior art designs have contributed to the manufacture of chirp free modulators, a need continues to exist for optical modulators that have reduced voltage-length products and exhibit improved performance. In particular, a need continues to exist for high impedance devices that have a low voltage-length product.

The present invention generally relates to an optical modulator that includes a waveguide structure formed on an electro-optical substrate that has a domain inversion. Preferably, the electro-optical substrate is formed from Z-cut lithium niobate or Z-cut lithium tantalate.

According to one aspect, the invention features an optical modulator that includes an interferometer waveguide structure formed on an electro-optical substrate that has a domain inversion between a first volumetric region of a first arm and a second volumetric region of a second arm of the interferometer waveguide structure. Two coplanar strip electrode structures, each extending near at least a portion of the first arm and the second arm, respectively, of the interferometer waveguide structure, are electrically coupled to each other.

In one example, the electro-optical substrate of the optical modulator of the invention has a first and a second ridge, including, respectively, at least a portion of a first arm and at least a portion of a second arm of an MZI. The substrate has a domain inversion between a region supporting the first arm and a region supporting the second arm of the MZI. Electrodes that have the same polarity are superimposed on the first and second ridges and are part of coupled electrode structures.

In another example, the electro-optical substrate includes an optical MZI and has a domain inversion between a region supporting a first arm and a region supporting a second arm of the MZI. A first electrode is superimposed on at least a portion of a first ridge and a second electrode is superimposed on at least a portion of a second ridge. The ridges include, respectively, at least a portion of the first arm and at least a portion of the second arm of the optical MZI. The first and second electrodes have the same polarity and are part of coupled electrode structures.

In a preferred embodiment, the optical modulator includes an electro-optical substrate having a domain inversion boundary between two arms of a MZI. Above at least a portion of the two arms is a coupled coplanar strip electrode arrangement, having two drive (signal or hot) electrodes with the same polarity. Underneath each of the drive electrode is a ridge and the drive electrodes are sandwiched between two ground electrodes.

The optical modulator of the invention is characterized by reduced voltage-length products at the cost of modest reduction in line impedance and can be used to design lower voltage analog devices, which, in turn, make practical the introduction of new analog links. In digital applications, the optical modulator of the invention can be incorporated in shorter devices and smaller platforms. With respect to uncoupled, double CPS designs, the modulator of the invention has improved performance. For instance, the coupled CPS arrangement employed in the modulator of the invention is associated with decreases in capacitance and air capacitance and increases in line impedance. In some of the preferred embodiments, the phase change in the interferometer is nearly doubled for a given voltage applied, and the voltage-length product is nearly halved.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention is related to a modulator that includes an interferometer waveguide structure formed on an electro-optical substrate that has at least one domain inversion. Coupled electrodes extend, respectively, near a first and second arm of the interferometer waveguide structure.

Figure 1:
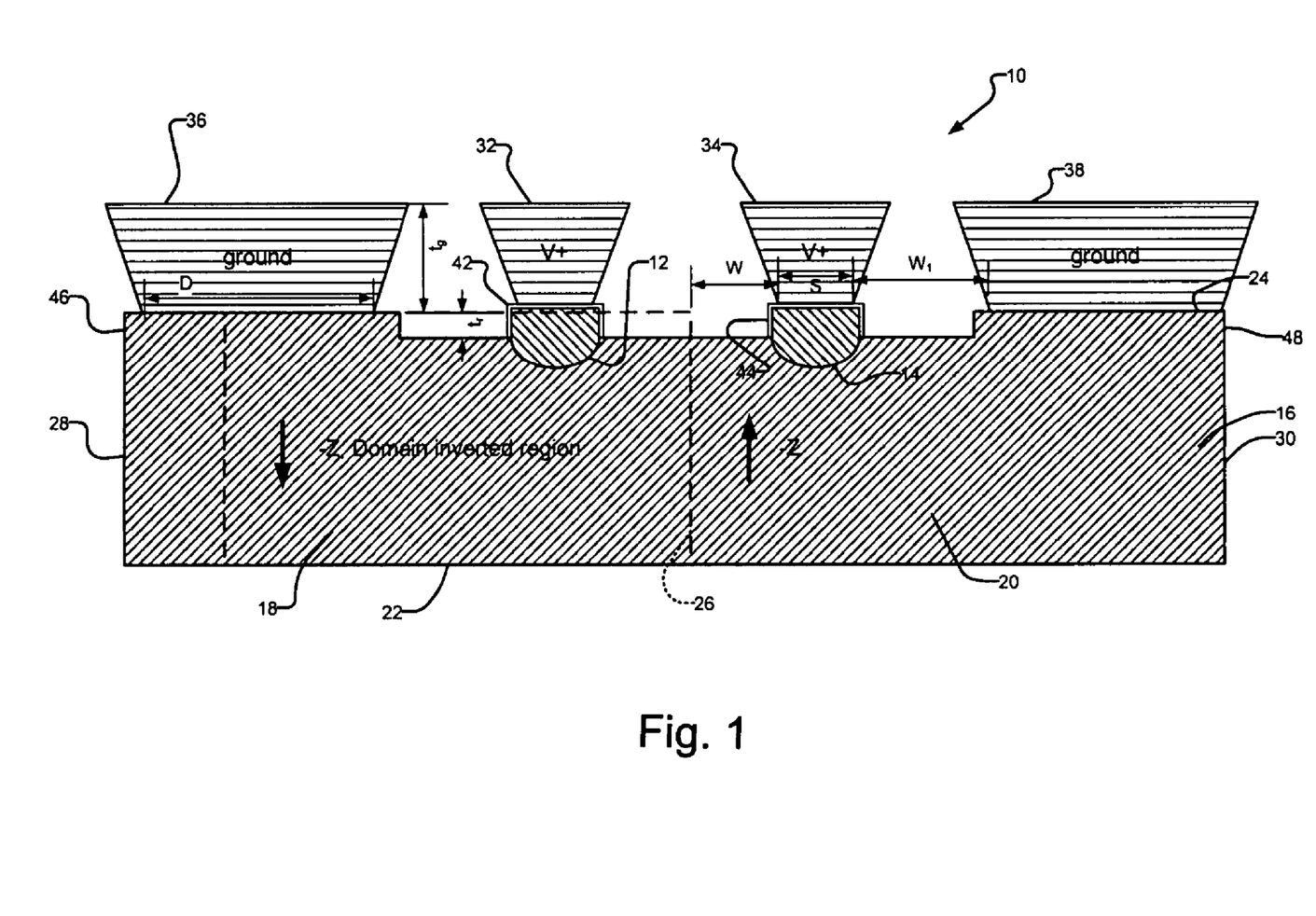
FIG. 1 is a schematic cross sectional view of a modulator according to the present invention.

Shown in FIG. 1 is a cross sectional view of modulator 10, which includes arms 12 and 14 of an interferometer waveguide structure, formed on substrate 16. The interferometer waveguide structure, for example a MZI, can be formed by techniques known in the art. For instance, a strip of titanium (Ti) metal can be deposited on an electro-optical blank. At high temperatures, Ti diffuses into the blank, forming the waveguide structure.

Generally, substrate 16 has a thickness in the range of from about 0.1 mm and about 1 mm. Preferably, it is formed of Z-cut $LiNbO_3$. In a Z-cut substrate, the z (also called the c) crystal axis is normal to the substrate surfaces having the largest area. In other examples of the invention, substrate 16 is fabricated from $LiTaO_3$. Other materials, for instance, KTP, poled glass or polymers, also can be utilized.

$LiNbO_3$, $LiTaO_3$ and other electro-optical materials are known to have ferroelectric properties. By virtue of their underlying crystal structure, ferroelectrics are able to maintain an electric polarization, or dipole moment, in the absence of an electric field.

Substrate 16 includes a domain inversion between region 18, supporting arm 12, and region 20, supporting arm 14. As used herein, terms such as "domain reversal" or "domain inversion" refer to a change in the direction of polarization in a ferroelectric material. Specifically, the domain in region 18 is inverted to a direction that is opposite (by 180 degrees) that of the domain in region 20. The opposite directions of the ferroelectric domains are shown schematically by arrows: the arrow in region 18 points to bottom surface 22 of substrate 16 and the arrow in region 20 points to top surface 24 of substrate 16. Substrate 16 can include additional domain inversions, not shown in FIG. 1.

Starting with a mono-domain ferroelectric sample, in which the material has a single polarization direction, a domain inversion between region 18 and 20 can be formed by techniques known in the art. Suitable techniques for inverting the domain in an electro-optical material such as $LiNbO_3$ are described in U.S. Pat. No. 6,760,493 B2 issued on Jul. 6, 2004 to Pruneri et al., in US. Patent Application Publication No. 2003/0012480 A1, by Pruneri et al., published on Jan. 16, 2003 and in US. Patent Application Publication No. 2003/0002766, by Pruneri et al., published on Jan. 2, 2003. The teachings of these documents are incorporated herein by reference in their entirety.

In one existing technique, domain inversion is achieved by electric field poling, whereby an electric field is applied along the c axis of a crystal. If the field exceeds a certain value, the ferroelectric domains can be inverted. Poling of $LiNbO_3$ is described, for instance, by M. C. Wengler et al., in Poling Dynamics of Lithium Niobate Crystals, Appl. Phys. B., Vol. 76, p. 393-396 (2003), the teachings of which are incorporated herein by reference in their entirety.

Other existing processes rely on the diffusion of ions at high temperature, close to the crystal Curie point. Electron beams and other techniques also can be employed to effect domain inversion in an electro-optical material such as $LiNbO_3$. These as well as newly discovered or newly developed techniques can be employed to reverse the domain in the electro-optical substrates discussed herein.

The domains between regions 18 and 20 can be inverted prior to forming the interferometer waveguide structure, after completing its fabrication, or at any suitable point during the manufacturing process employed to produce modulator 10.

In one aspect of the invention, one domain occupies a volumetric region of arm 12 and the opposite domain occupies a volumetric region of arm 14. The volumetric regions can extend from domain inversion boundary 26 to edges 28 and 30 of substrate 16. In other examples, the volumetric regions extend partially towards edges 28 and 30. Optionally, additional regions of domain inversion (not shown in FIG. 1) can be formed to extend to edges 28 and 30.

In one embodiment, domain inversion in one region with respect to the other extends throughout the thickness of substrate 12, from top surface 24 to bottom surface 22. In other examples, domain inversion extends from top surface 24 partially into the thickness of substrate 16. Preferably, each of the domains occupies a volume such that the overlap integral under arms 12 and 14 is optimized.

Electrode segments 32 and 34 extend, respectively, near arms 12 and 14 of the waveguide structure. For example, electrode segments 32 and 34 are superimposed on arms 12 and 14 by plating, although other metal deposition techniques can be used such as sputtering. Preferably, electrode segments 32 and 34 are sandwiched between electrode segments 36 and 38.

In one aspect of the invention, all four electrodes have the same thickness, $t_g$. Generally, $t_g$ is in the range of from about 1 to about 200 micrometers or microns (μm), preferably in the range of from about 10 μm to about 100 μm. Electrode segments 32 and 34 can have the same width, S, in the range of from about 4 μm to about 20 μm. Electrode segments 36 and 38 also can have the same width, D, in the range of from about 20 μm to about 4000 μm. S and D can be the same or different from each other.

In one embodiment, electrode segments 32, 34, 36 and 38 are part of electrode structures fabricated from gold. Copper, silver, or other suitable materials that are electrically conductive also can be utilized.

The structures are coupled to each other. In a coupled arrangement, electrode segments 32 and 34 are sufficiently close together to cause the structures to perturb each other's electric fields. Generally, in a coupled arrangement, the lateral distance between electrode segments 32 and 34 is less than 100 μm.

In one aspect of the invention, a voltage is applied to electrode segments 32 and 34, while electrode segments 36 and 38 are used as ground electrodes. In this arrangement, electrode segments 32 and 34 are signal, drive or "hot" electrode segments. Hot electrode segment 32, near arm 12, forms, together with ground electrode segment 36, a coplanar strip (CPS) electrode structure. A second CPS electrode structure includes hot electrode segment 34, near arm 14, and ground electrode segment 38.

A voltage also can be applied to electrode segments 36 and 38, now the hot electrode segments, while electrode segments 32 and 34 can be employed as ground electrodes.

The two CPS electrode structures, extending, respectively, near arms 12 and 14, are coupled to each other, forming an overall arrangement that is referred to herein as a "coupled CPS" arrangement. In a coupled CPS arrangement, the lateral distance between electrode segment 32 and electrode segment 34 generally is less than about 100 μm. Preferably, the lateral distance between electrode segments 32 and 34 is in the range of from about 10 μm and about 50 μm. It is believed that in a coupled CPS arrangement some of the electric field on the drive (hot) electrode segment in one CPS "leaks" to the ground electrode segment of the other CPS. Coupling is demonstrated by a decrease in capacitance and air capacitance and by an increase in line impedance, as further discussed below.

In an arrangement symmetrical with respect to a centerline, electrode segments 32 and 34 are separated from the centerline, e.g., domain inversion boundary 26, by a distance w, with 2 w being the strip separation, i.e., the distance between electrode segment 32 and electrode segment 34. In a coupled arrangement, 2 w generally is less than 100 μm and preferably is in the range of from about 10 μm and about 50 μm.

In a symmetrical arrangement, the distance between electrode segment 32 and electrode segment 36 is essentially the same as the distance between electrode segment 34 and electrode segment 38. This distance is referred to herein as the CPS gap, $w_1$, and generally is in the range of from about 20 μm and about 100 μm.

A buffer layer, not shown in FIG. 1, formed from silicon dioxide ($SiO_2$), ceramics, polymers, or any combinations thereof, can be used to isolate the optical field in the interferometer waveguides from the metal electrodes. In a preferred example, the entire top surface 24, including arms 12 and 14, is coated with a $SiO_2$ buffer layer. In other embodiments, the buffer layer coats one or more sections of top surface 24. Generally the buffer layer has a thickness, t, in the range of from about 0.25 μm to about 3 μm, preferably in the range of from about 0.5 μm to about 1.5 μm.

In one embodiment, substrate 16 is ridged at top surface 24, with ridges 42 and 44 supporting arms 12 and 14 and located beneath electrode segments 32 and 34. Similarly, ridges 46 and 48 can be formed underneath electrode segments 36 and 38.

In one aspect of the invention, ridges 42, 44, 46 and 48 have essentially the same depth, $t_r$. Preferably, $t_r$ is in the range of from about 0.5 μm to about 20 μm. In practice, only ridges of a depth of about 6μm or greater have been formed using currently available technologies. Thus in one aspect of the invention, $t_r$ is about 6-8 μm.

The width of ridges 42 and 44 is selected to accommodate arms 12 and 14 and to support electrode segments 32 and 34. Preferably, ridges 42 and 44 have a width in the range of from about 6 μm to about 20 μm; ridges 46 and 48 have a width in the range of from about 20 μm to about 4000 μm.

Ridged substrates can be formed by etching or by another suitable process, as known in the art. Modulators with ridged substrates are described, for example, in incorporated U.S. Pat. Nos. 6,304,685 B1 and 6,356,673.

Figure 2:
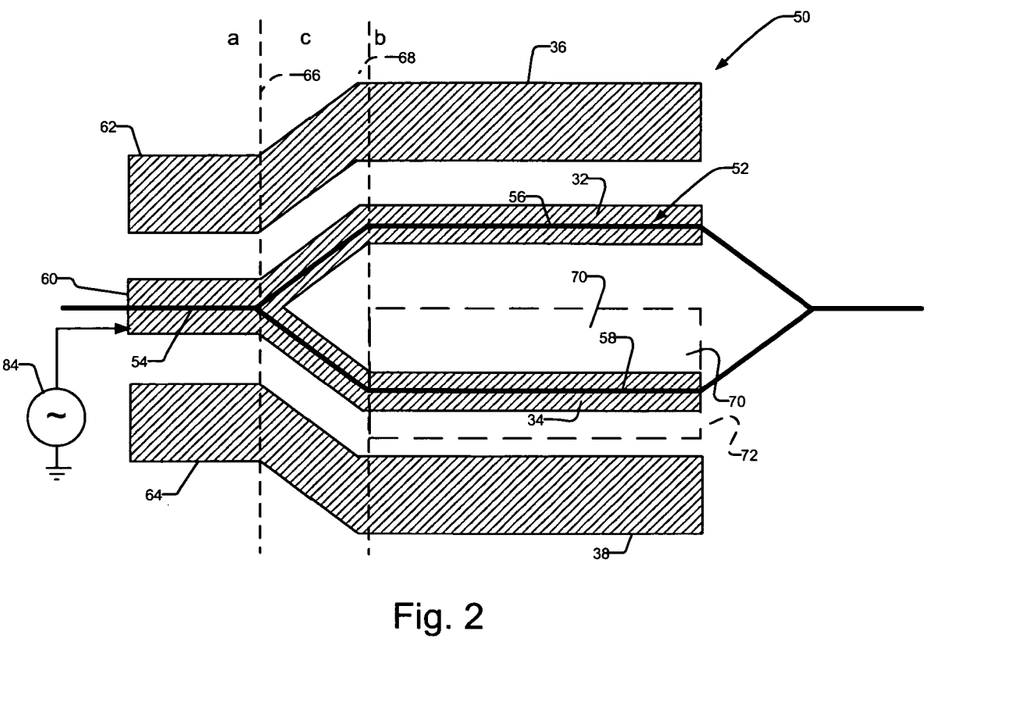
FIG. 2 is a schematic diagram of a modulator of the invention showing a coupled coplanar strip arrangement having a coplanar waveguide input.

A schematic diagram of an optical modulator of the invention is presented in FIG. 2. Shown in FIG. 2 is optical modulator 50 including MZI 52, formed on an electro-optical substrate such as described above. As known in the art, an optical signal, generated, for instance, by a laser, and directed to input waveguide 54 is divided and propagates along MZI arms 56 and 58.

A modulating signal driven at a voltage $V_{in}$ and a frequency generally in the range of Megaherz to Gigahertz, typically 40 GHz or more, is applied from a source 84, to input electrode segment 60. The source can be a microwave generator, a digital signal generator, or a signal received from an antenna. Input electrode 60 can be deposited or superimposed over input waveguide 54, for example by plating.

The electrode arrangement in the input region, indicated in FIG. 2 as region a, is that of a coplanar waveguide (CPW) electrode, with hot input electrode segment 60 disposed between input ground electrode segments 62 and 64.

In the active region of MZI 52, (indicated as region b in FIG. 2) hot electrode segments 32 and 34, extending, respectively, near MZI arms 56 and 58, are sandwiched between ground electrode segments 36 and 38. As described above, hot electrode segment 32, together with ground electrode segment 36, form a CPS electrode arrangement. Similarly, hot electrode segment 34, together with ground electrode segment 38, form a second CPS electrode arrangement. For electrode segments 32 and 34 that are coupled to each other, the overall arrangement in the active region b of MZI 52 is that of a coupled CPS.

Input transition section c, indicated in FIG. 2 by dotted lines 66 and 68, connects the input CPW electrode to the coupled CPS arrangement. The optical modulator can be provided with an output CPW connected to the CPS arrangement through an output transition section. In one aspect of the invention, the output CPW and output transition section are similar to those described for the input region and input transition section of optical modulator 50.

During operation, the voltage signal transmitted through the coupled CPS structure interacts with the optical signal propagated through MZI arms 56 and 58 by inducing changes in the refractive index of the waveguides, resulting in a modulation of the phase of the propagating optical signals, at the frequency of the drive signal. The voltage on electrode segment 32 has the same polarity as the voltage on electrode segment 34 and $V_1=V_{in}$, where $V_1$ is the voltage on each of electrode segments 32 and 34.

In the absence of domain reversal, a voltage of the same polarity on electrode segments 32 and 34 would result in directed fields across MZI arms 56 and 58 that have the same direction. The phase changes in each arm of MZI arms 56 and 58 would have the same sign and magnitude, and the interferometer phase difference would be zero.

This result is offset by rotating the ferroelectric domain by 180 degrees in region 70, which is indicated in FIG. 2 by rectangular broken line 72. In one example, region 70 extends over the entire length of the active MZI region, b, as shown in FIG. 2. Domain reversal also can be formed in a region having a longer length, extending outside active MZI region b. Region 70 can have length smaller than the length of active MZI region b, also.

With the change in the sign of the electro-optical coefficient in MZI arm 58, with respect to MZI arm 56, the phase change in MZI arm 58 is changed by 180 degrees with respect to that in MZI arm 56 and MZI 52 operates as desired, with the interferometer phase change being twice the change in one arm.

Figure 3:
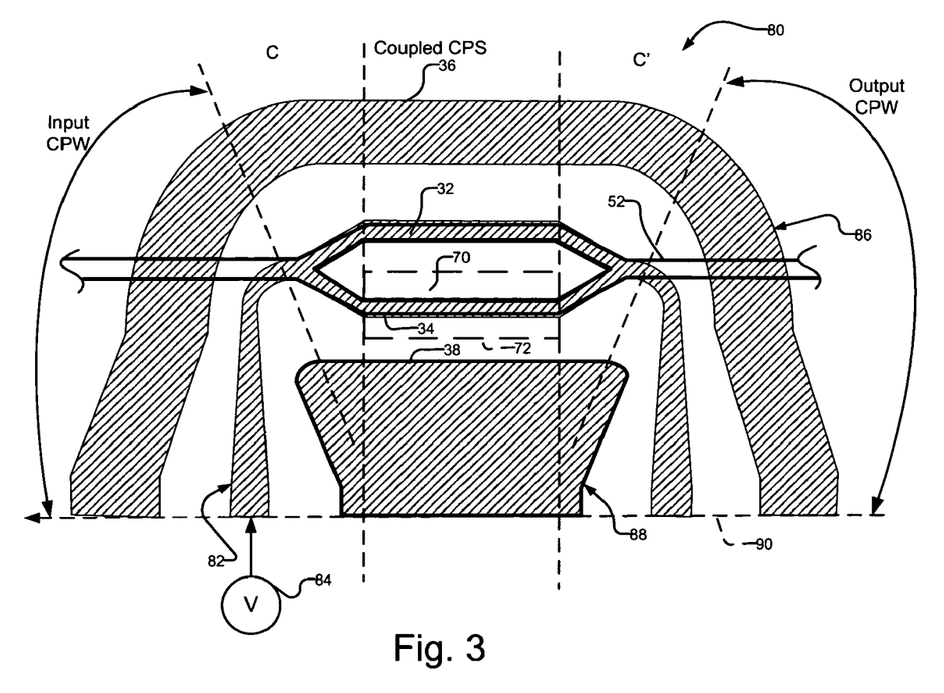
FIG. 3 is a top plan view of a modulator of the invention having horn input and output coupling connections.

An embodiment of the optical modulator of the invention, including preferred input and output coupling connections, is shown in FIG. 3. Shown in FIG. 3 is modulator 80, which includes MZI 52, essentially as described above. MZI 52 is formed on an electro-optical substrate having a domain inversion in region 70, indicated by rectangular broken line 72. In the active region, MZI 52 includes coupled electrode segments 32 and 34, which are disposed between ground electrode segments 36 and 38. Electrode segments 32 and 34 are part of electrode 82, which receives a voltage $V_{in}$ from a source 84. As discussed above, $V_{in}=V_1$, where $V_1$ is the voltage on electrode segments 32 and 34. Electrode segments 36 and 38 are part, respectively, of ground electrodes 86 and 88.

In the active region, optical modulator 80 includes a coupled CPS segment, formed by hot electrode segments 32 and 34, sandwiched between ground electrode segments 36 and 38. Optical modulator 80 also includes input CPW segment and output CPW segment. Input and output transition sections, indicated in FIG. 3 as C and C', connect, respectively, the input and output CPW segment to coupled CPS segment.

Outside the active region of MZI 52, the electrodes are bent and fan out for input and output connections at device edge 90. A bend of about 90 degrees is preferred but bends of a different angle also can be formed. Bends and connections that can be employed include "horn" coupling structures, similar to those disclosed, for example, in U.S. Pat. No. 6,356,673 B1.

To determine optimum conditions for a modulator such as described in FIGS. 2 and 3, the following parameters are defined. For the input CPW waveguide, $P_{in}$, $Z_{in}$, and $V_{in}$, are, respectively, the input power, impedance, and voltage. For each CPS structure, considered separately, power, impedance, and voltage are defined as $P_1$, $Z_1$, and $V_1$.

In the limit of uncoupled structures, when the separation between the center strips is large, e.g., 100 μm or more, the total "coupled" CPS power and impedance is:

$$P_{tot}=2P_1 \text{ and } Z_{tot}=Z_1/2 \tag{1}$$

since the total power is the sum of the powers on each line, and the two line impedances are in parallel.

To avoid reflections at the interface it is required that $Z_{tot}=Z_{in}$, from which it follows that $P_{tot}=P_{in}$. The voltage on each CPS line is then given by:

$$V_1 = \sqrt{P_1 Z_1} = \sqrt{\left(\frac{P_{in}}{2}\right)(2Z_{in})} = \sqrt{P_{in} Z_{in}} = V_{in} \tag{2}$$

so that the voltage is conserved across the transition, and the voltage on each of the CPS "hot" strips is the same as the input voltage on the CPW line. As a result, the line impedance of each CPS structure must be twice that of the input CPW impedance.

This simple model shows that for a 50 Ohm input, the individual, uncoupled CPS structures need to have an impedance of near 100 Ohms.

More sophisticated numerical calculations illustrate that, in the case of coupled CPS structures, this requirement is relaxed, as further discussed below.

Figure 4:
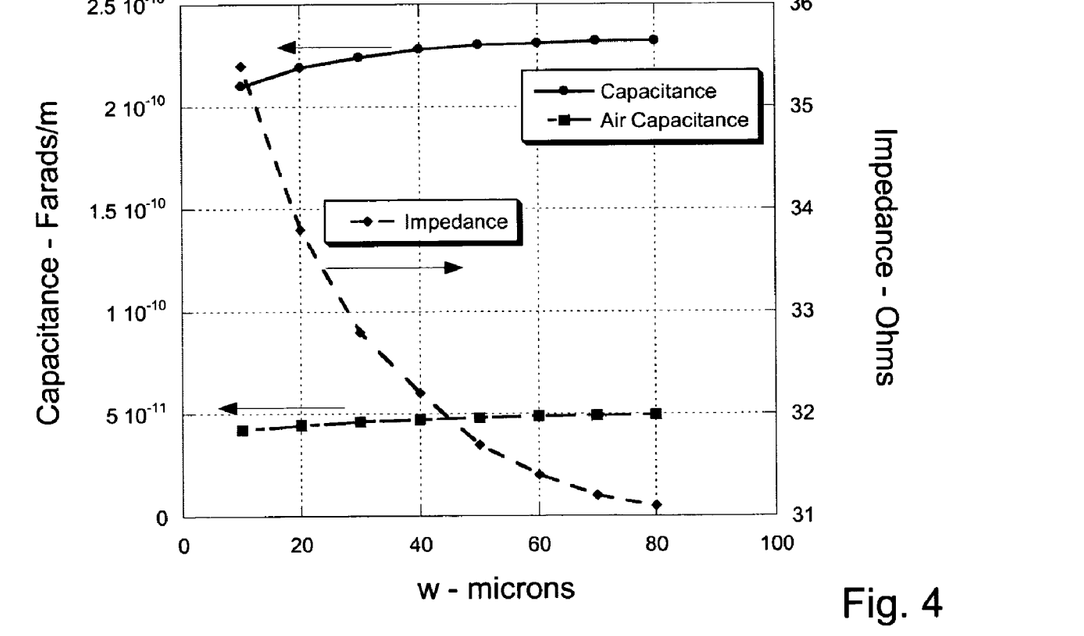
FIG. 4 is plot of capacitance and impedance as a function of strip separation in a coupled electrode strip modulator of the invention.

Detailed finite element calculations were carried out for a modulator of the invention having a thin $SiO_2$ buffer layer of about 1 μm. For a device symmetrical about the centerline, device capacitances (material and air) were calculated for half the structure and doubled for the whole structure. Mode effective index and line impedance were calculated from the capacitances. Results are shown in FIG. 4 as a function of ½ the center strip separation, given by w. The plots demonstrate the decrease in capacitance and air capacitance and increase in line impedance for coupled CPS with w<50 μm.

Since the line impedance is inversely proportional to the product of material capacitance(C) and air capacitance($C_a$), $$Z = \frac{1}{c}\frac{1}{\sqrt{CC_a}} \tag{3}$$

where c is the speed of light, the reduction of capacitance for tightly coupled strips favors achieving high impedance for the coupled structure. Other parameters used for the plots shown in FIG. 4 are: s=6μm, tg=40μm, tr=0, and $w_1$=40μm.

For the plots shown in FIG. 4, parameters were not adjusted to achieve velocity match.

Generally, for velocity matching the electrical field and the light waves propagate with substantially the same phase velocity. More specifically, when the electrical signal and optical signal are velocity matched, the effective index of the electrical signal in the modulator is the same or essentially the same as the effective index of the optical signal in the modulator.

The effective index of the optical mode is fixed by the index of refraction of the substrate. The electrical effective index is given by:

$$n_{eff} = \sqrt{\frac{C}{C_a}} \quad (4)$$

Figure 5:
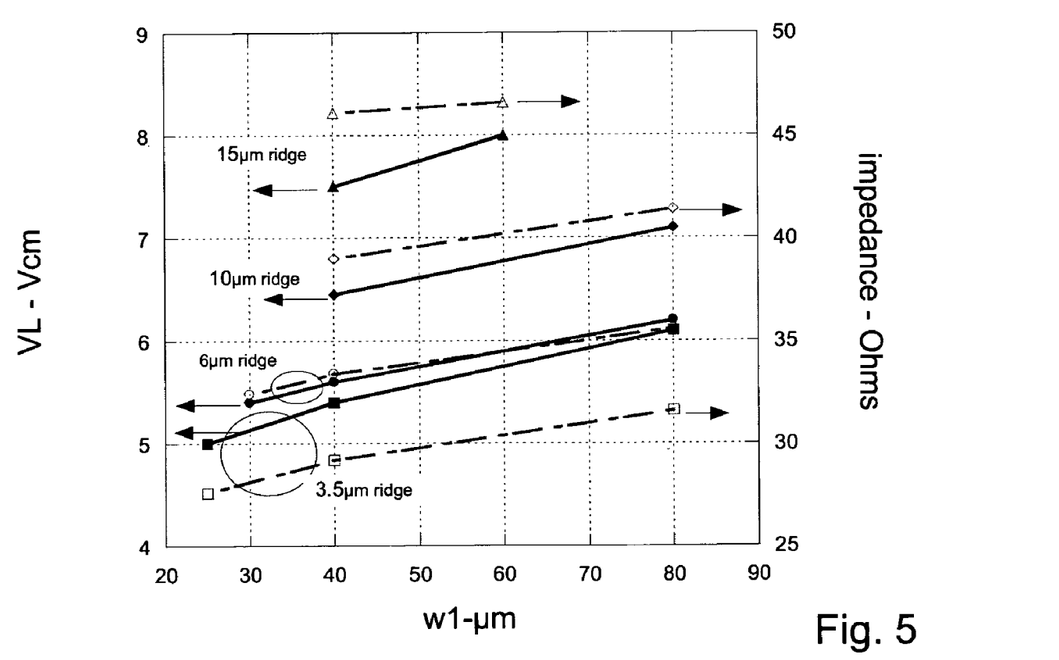
FIG. 5 is a plot of voltage-length product and impedance, at specified ridge depths, as a function of CPS gap, $w_1$, in a modulator of the invention.

For velocity match in a Z-cut LiNbO$_3$ modulator of the invention, the equal electrical and optical waveguide effective indices are 2.14. FIG. 5 shows VL product and device impedance for velocity matched ($n_{eff}$=2.14), coupled CPS structures as a function of CPS gap $w_1$, for 8 μm wide ridge waveguides, with varying ridge depth and with s=6 μm.

Figure 6:
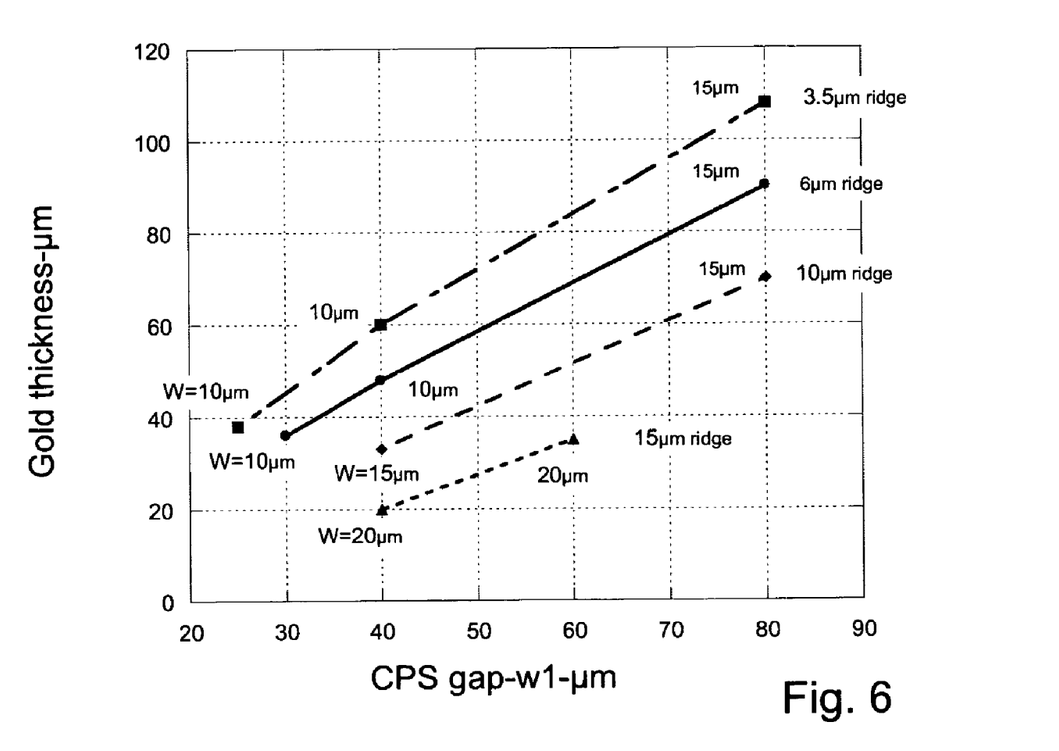
FIG. 6 is a plot of electrode thickness required for velocity matching for each of the modulators shown in FIG. 5, along with the value of w that was used for each geometry.

In FIG. 6 the electrode thickness required for velocity match is shown for each of the devices of FIG. 5 along with the value of w used for each geometry. In general w was chosen as small as was considered practical. Increased w values are shown for larger electrode thickness values and deeper ridge depths.

According to the calculations, as seen in FIG. 5, VL products of 5-8 Vcm can be achieved for device impedances of 30-45 Ohms, depending on the ridge depth. Since ridge depths of 6μm and higher can be achieved with existing fabrication technologies, 6-8 μm ridges are considered practical, resulting in VL products of ~6Vcm. Compared to an impedance of 50 Ohms (no reflection), the plots illustrate that a modulator with a VL product of ~6 Vcm presents only a small tradeoff in impedance, which was calculated to be ~35 Ohms.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical modulator comprising:
   a. an interferometer waveguide structure formed in an electro-optical substrate, said substrate having a domain inversion between a first volumetric region of a first arm and a second volumetric region of a second arm of the interferometer waveguide structure; and
   b. two coplanar strip electrode structures, each extending near at least a portion of the first arm and the second arm, respectively, of the interferometer waveguide structure, wherein the two coplanar strip electrode structures include two inner electrode segments sandwiched between two outer electrode segments wherein the two inner electrode segments have the same polarity and a lateral distance between the two inner electrode segments is less than about 100 micrometers to be electrically coupled to each other.

2. The optical modulator of claim 1, wherein the interferometer waveguide structure forms a Mach-Zehnder interferometer.

3. The optical modulator of claim 1, wherein the waveguide structure comprises ridged waveguides.

4. The optical modulator of claim 1, further comprising a buffer layer disposed on the electro-optical substrate.

5. The optical modulator of claim 1, wherein the electro-optical substrate is formed of a Z-cut lithium niobate.

6. The optical modulator of claim 1, wherein the lateral distance between electrode segments is in the range of from about 20 to about 100 micrometers.

7. The optical modulator of claim 1, further comprising at least one input waveguide electrode segment connected through an input transition section to the two inner electrode segments.

8. The optical modulator of claim 7, further comprising at least one output waveguide electrode segment connected through an output transition section to the two inner electrode segments.

9. An optical modulator comprising:
   a. an electro-optical substrate including a Mach Zehnder optical interferometer;
   b. a first electrode superimposed on at least a portion of a first ridge that includes a first arm of the Mach Zehnder optical interferometer; and
   c. a second electrode having the same polarity as the first electrode and superimposed on at least a portion of a second ridge that includes a second arm of the Mach Zehnder optical interferometer;
   wherein the first and second electrodes have the same polarity with each other, are separated by a lateral distance of less than 100 micrometers, and are part of coupled electrode structures and the electro-optical substrate includes a domain inversion between a region supporting the first arm and a region supporting the second arm, wherein the first ridge and the second ridge have a ridge depth, $t_r$, that is greater than about 0.5 micrometers.

10. The optical modulator of claim 9, wherein the electro-optical substrate is selected from the group consisting of lithium niobate and lithium tantalate.

11. The optical modulator of claim 9, wherein the electro-optical substrate is formed of Z-cut lithium niobate.

12. The optical modulator of claim 9, further comprising a buffer layer over the first and second ridges.

13. The optical modulator of claim 9, wherein the first and second ridge have a ridge depth, $t_r$, of less than 20 micrometers.

14. The optical modulator of claim 9, wherein the first and second electrode have a thickness, $t_g$, in the range of from about 1 to about 200 micrometers.

15. The optical modulator of claim 9, wherein the region of the first arm section further includes a first ground electrode ridge and the region of the second arm section further includes a second ground electrode ridge.

16. The optical modulator of claim 15, wherein a first ground electrode is disposed above the first ground electrode ridge and a second ground electrode is disposed above the second ground electrode ridge.

17. An optical modulator comprising:
   a. an electro-optical substrate having a domain inversion boundary between two arms of a Mach Zehnder interferometer;
   b. a coupled coplanar strip electrode arrangement including two drive electrodes above at least a portion of said two arms, wherein the drive electrodes have the same polarity and are sandwiched between two ground electrodes; and
   c. a ridge underneath each of the drive and ground electrodes wherein a lateral distance between neighboring drive and ground electrodes, $w_1$, is less than 100 micrometers and a lateral distance between the two drive electrodes is less than 100 micrometers.

18. The optical modulator of claim 17, wherein the electro-optical substrate is formed of Z-cut lithium niobate.

19. The optical modulator of claim 17, wherein each of the drive and ground electrodes is separated from the substrate surface by a buffer layer.

20. The optical modulator of claim 19, wherein the buffer layer has a thickness, t, in the range of from about 0.25 and about 3 micrometers.

21. The optical modulator of claim 17, wherein the ridge has a ridge depth, $t_r$, in the range of from about 0.5 to about 1.5 micrometers.

22. The optical modulator of claim 17, wherein each drive electrode is separated from the domain inversion boundary by a distance w.

23. The optical modulator of claim 22, wherein w is less than 50 micrometers.

24. The optical modulator of claim 17, wherein each of the drive and ground electrodes has essentially the same electrode thickness, $t_g$.

25. The optical modulator of claim 24, wherein $t_g$ is in the range of from about 1 to about 200 micrometers.

26. The optical modulator of claim 17, wherein a lateral distance between neighboring drive and ground electrodes, $w_1$, is in the range of from about 20 to about 100 micrometers.

27. The optical modulator of claim 17, further comprising at least one transition between a coplanar waveguide electrode and a coplanar strip electrode.

* * * * *